United States Patent [19]
North

[11] Patent Number: 5,946,847
[45] Date of Patent: Sep. 7, 1999

[54] CLICKING CAPSULES FOR FISHING LURES

[76] Inventor: Dennis C. North, 205 Cook Dr., Waskom, Tex. 75692

[21] Appl. No.: 08/951,708

[22] Filed: Oct. 15, 1997

Related U.S. Application Data

[63] Continuation of application No. 08/497,393, Jun. 30, 1995, abandoned.

[51] Int. Cl.$^6$ .................................................. A01K 85/00
[52] U.S. Cl. .............................................................. 43/42.31
[58] Field of Search ............................................. 43/42.31

[56] References Cited

U.S. PATENT DOCUMENTS

| | | | |
|---|---|---|---|
| 3,935,660 | 2/1976 | Plew | 43/42.31 |
| 3,988,851 | 11/1976 | Sarcharnoski | 43/42.31 |
| 4,747,228 | 5/1988 | Giovengo | 43/42.31 |
| 4,791,750 | 12/1988 | Gammill | 43/42.31 |
| 5,001,856 | 3/1991 | Gentry | 43/42.31 |
| 5,018,297 | 5/1991 | Kennedy | 43/42.31 |
| 5,038,513 | 8/1991 | Hardin | 43/42.31 |
| 5,230,178 | 7/1993 | Dillard | 43/42.31 |
| 5,381,622 | 1/1995 | Tregre | 43/42.31 |
| 5,426,886 | 6/1995 | Stanley | 43/42.31 |
| 5,428,919 | 7/1995 | Enomoto | 43/42.31 |
| 5,499,471 | 3/1996 | Foutch | 43/42.31 |
| 5,517,782 | 5/1996 | Link | 43/42.31 |

*Primary Examiner*—Kurt Rowan
*Attorney, Agent, or Firm*—John M Harrison

[57] ABSTRACT

Clicking capsules for fishing lures, which capsules may be constructed of plastic, glass and metal and encapsulate one or more elongated clicking elements. The clicking elements are typically constructed of metal wire such as copper, aluminum and steel and are generally cylindrical with varying diameter and rounded, blunt, or bevelled ends, to enhance the clicking effect when the clicking elements slide and strike the ends of the capsules, as well as each other. The clicking capsules may be inserted in flexible plastic fishing lures such as simulated grubs, worms, crawfish and the like and may also be inserted in cavities provided in the hard bodies of such fishing lures as jigs, "crank baits", top water lures and the like. Furthermore, the clicking capsules can be fitted with clips or otherwise attached to the wire harness of spinner bait lures or to the hooks of jigs and other lures to effect the desired clicking noise when the lures are retrieved.

6 Claims, 3 Drawing Sheets

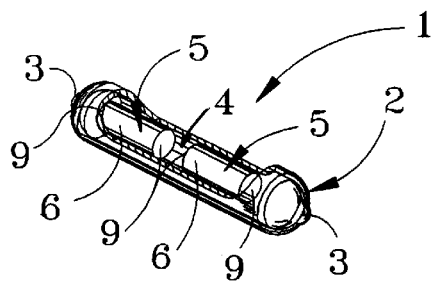 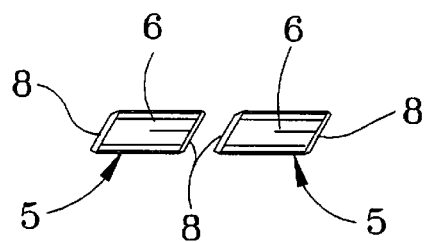
FIG. 1  FIG. 2A
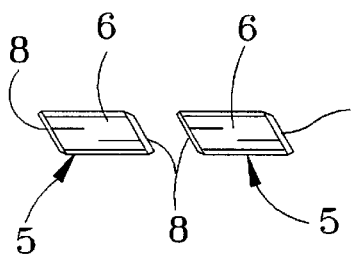 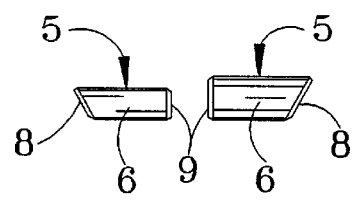 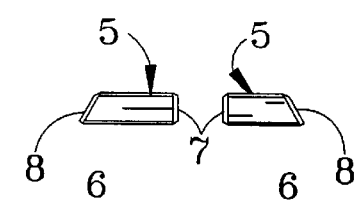
FIG. 2B  FIG. 2C  FIG. 2D
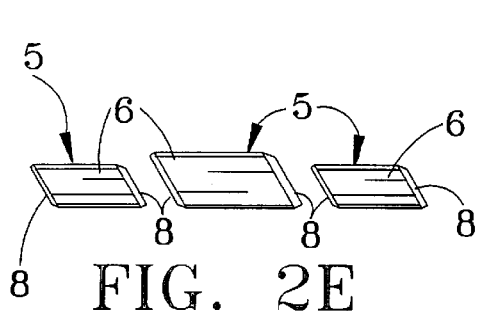 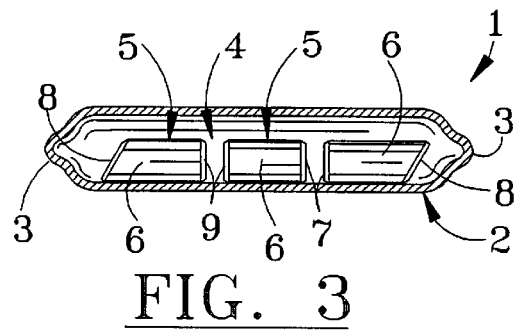
FIG. 2E  FIG. 3
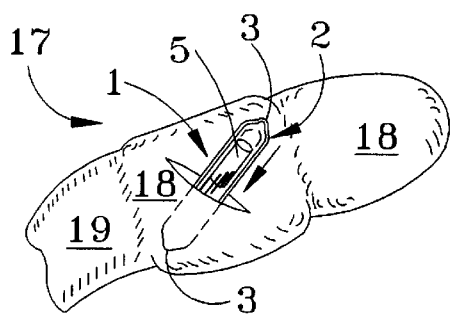 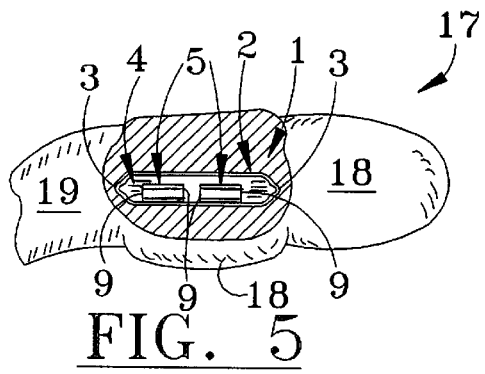
FIG. 4  FIG. 5

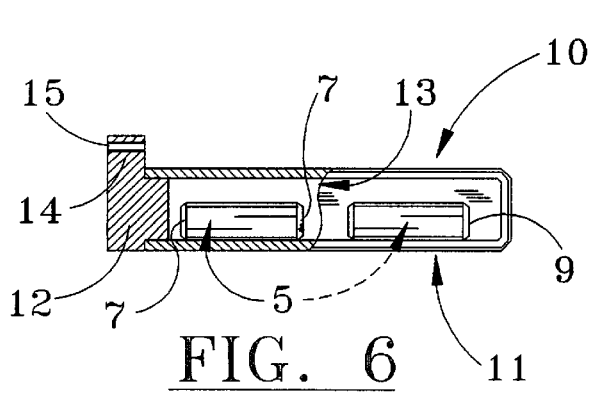
FIG. 6
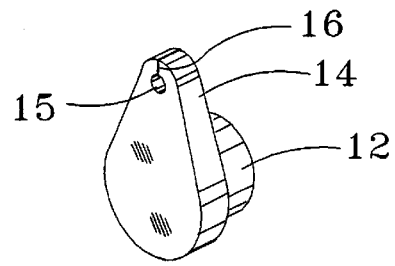
FIG. 7
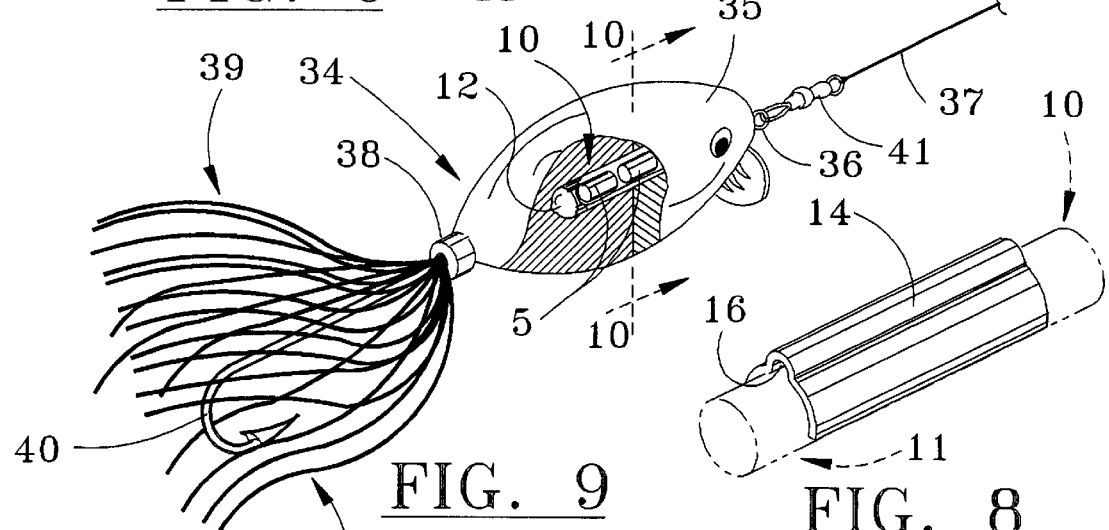
FIG. 8
FIG. 9
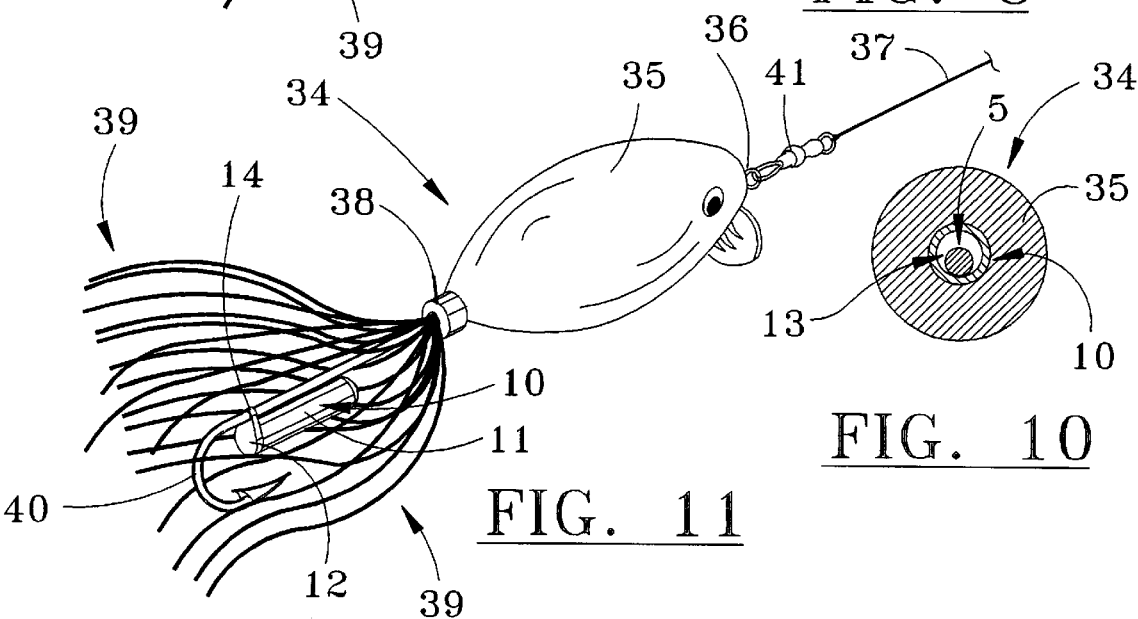
FIG. 10
FIG. 11

CLICKING CAPSULES FOR FISHING LURES

This is a continuation of copending application Ser. No. 08/497,393 filed on Jun. 30, 1995, now abandoned.

BACKGROUND OF THE INVENTION

Field of the Invention

This invention relates to fishing lures and more particularly, to glass, plastic and metal clicking capsules for fishing lures, wherein the clicking capsules are inserted in the bodies of soft, flexible plastic fishing lures such as simulated worms, grubs, crawfish and the like and inserted in bored or molded apertures, cavities or openings provided in hard body fishing lures such as jigs, top-water lures and "crank baits". In a first preferred embodiment, the clicking capsule is characterized by a transparent, plastic or glass ampoule or capsule which encapsulates one or more clicking elements constructed of a selected length of metal wire and therefore having a cylindrical cross-section, with rounded or blunt, squared or tapered ends. The clicking elements may be of the same or dissimilar diameter, length and end configuration and are sufficiently smaller in diameter than the internal cavity of the clicking capsule, to facilitate sliding contact with each other and the internal ends of the capsule without stacking. The metal clicking elements may be typically shaped of metal such as copper, aluminum and steel. In a first preferred embodiment, transparent clicking capsules, typically constructed of glass vials or tubing are inserted in the bodies of flexible plastic lures such as simulated grubs, worms, crawfish and the like, such that retrieval of the flexible plastic lures through a waterbody causes the lures to emit a clicking sound as the clicking elements slide back and forth in the shell cavity of the clicking capsule, striking each other and the internal ends of the capsule, to emit the desired fish-attracting clicking noise.

In another preferred embodiment of the invention a metal clicking capsule is provided, which includes a metal capsule tube closed at one end and plugged at the opposite end to contain one or more clicking elements therein. The metal clicking capsule is typically attached by a clip, tape or other device to either the hook or wire harness of various types of fishing lures such as jigs, spinner baits and the like, to facilitate emission of a clicking noise when these lures are retrieved through a waterbody. In one embodiment the metal clicking capsule plug or tube is fitted with a clip for removable attachment to the hook or spinner bait harness and in another embodiment the clicking capsule can be taped, glued or otherwise attached to the hook or spinner harness, according to the knowledge of those skilled in the art.

One of the most significant innovations in recent years in the fishing industry is that of providing fishing lures with capsules containing lead or steel shot to effect a rattling action when the lure is retrieved. These capsules have been embedded in the body of the lure, attached to the lure by various means and otherwise used to facilitate a rattling noise as the lure is retrieved through a waterbody. The resulting attraction to game fish is well documented in larger catches, bigger fish and more action than is possible with lures not having the rattling action. Typical of the "rattling" lures is the "Fishing Lure Sound Producer" detailed in U.S. Pat. No. 3,988,851, dated Nov. 2, 1976, to Sacharnoski, Sr. The capsule includes a glass tube with closed, sealed ends and containing multiple free spherical balls, preferably metal, for association with a fishing lure, to produce clear, resonant sounds that attract fish to the lure without materially affecting the attitude of the lure or its course through the water. Another fishing lure sound-producer is detailed in U.S. Pat. No. 4,203,246, dated May 20, 1980, also to Sacharnoski. The capsule includes a glass tube with closed ends and containing multiple free spherical balls, preferably metal, for association with the fishing lures to roll in the capsule and produce clear resonant sounds that attract fish to the lure in its course through the water. U.S. Pat. No. 4,747,228, dated May 31, 1988, to Jay Giovengo, Jr., details a fishing lure in which at least one steel ball rolls in a closed, hollow container and the container is disposed in proximate relationship to a hook, such that when the assembly is moved through water, the movement of the steel balls in the cylinder generates a noise that attracts the fish. U.S. Pat. No. 4,791,750, dated Dec. 20, 1988, to R. M. Gammill, details a "Fishing Lure With Internal Rattle". The fishing lure includes a molded lure body such as a lead jig head, in a non-magnetic cylinder or capsule provided with at least one non-magnetic ball therein, the capsule inserted in a cavity provided in the jig head, in order to produce a sound of desired intensity and resonance and attract fish when the fishing lure is retrieved. A "Rattling Fishing Lure" is detailed in U.S. Pat. No. 5,001,856, dated Mar. 26, 1991, to Don Gentry. The fishing lure has a rattling device which includes an elongated capsule of synthetic resin material containing noise makers and having a cap which also serves to secure the capsule to the lure. The exterior of the capsule is exposed to the water in which the lure is immersed, to optimally transmit noise from the rattle to the water for attracting fish. U.S. Pat. No. 5,018,297, dated May 28, 1991, to Michael B. Kennedy, Jr., details an "Audible Fishing Lure" which includes a fish-attracting rattling skirt assembly. The skirt assembly includes a noise-making subassembly characterized by a hollow housing, an object enclosed within the hollow housing for generating fish-attracting audible noises, the first hollow, resilient tube having an outer wall and an inner diameter allowing insertion and retention of the hollow housing into the first hollow, resilient tube, a second hollow, resilient tube having an outer wall and open ends having open-ended space within its inner wall unoccupied and reserved for allowing adaptation to the fishing lure and the fish-attracting, undulation skirt.

It is an object of this invention to provide clicking capsules for fishing lures, which capsules are characterized by a hollow interior or cavity fitted with at least one elongated, generally cylindrical body having a bevelled, rounded or blunt end for contacting the ends of the capsule and making a clicking noise when the lure in which the capsule is inserted is retrieved through a waterbody.

Another object of the invention is to provide transparent clicking capsule for insertion in fishing lures, which clicking capsule includes at least one clicking element slidably disposed in the interior of the capsule for emitting a clicking noise when the capsule is inserted in the lure and the lure is retrieved through a waterbody.

Still another object of this invention is to provide plugged metal clicking capsules for receiving one or more elongated metal clicking elements that are slidably disposed in the capsule, wherein the capsules are inserted in fishing lures and contact each other and the capsules, to emit a clicking noise when the fishing lures are retrieved through a waterbody.

Still another object of this invention is to provide new and improved glass, plastic and metal clicking capsules for receiving one or more generally cylindrical metal clicking elements of the same or different diameter, having blunt or squared, tapered or bevelled ends, the clicking elements being slidably disposed inside the clicking capsules for emitting a clicking noise when the clicking capsules are inserted in the body of flexible plastic or hard body fishing lures and the lures are retrieved through a waterbody.

SUMMARY OF THE INVENTION

These and other objects of the invention are provided in new and improved clicking capsules for fishing lures, which clicking capsules may be constructed of such materials as glass, plastic or metal and incorporate one or more elongated, sliding, wire clicking element segments having a selected diameter which is less than the internal diameter of the capsules, the clicking elements further characterized by bevelled, rounded or blunt ends, to optimize the clicking effect manifested when the clicking capsules are inserted in the hard or soft body portions of fishing lures and the fishing lures are retrieved through a waterbody.

BRIEF DESCRIPTION OF THE DRAWING

The invention will be better understood by referenced to the accompanying drawing, wherein:

FIG. 1 is a perspective view, partially in section, of a transparent glass or plastic clicking capsule of this invention, with a pair of cylindrical clicking elements slidably disposed therein;

FIG. 2A is a side view of a set of bevelled clicking elements for disposition inside the clicking capsule illustrated in FIG. 1;

FIG. 2B is a side view of another set of oppositely-bevelled clicking elements;

FIG. 2C is a side view of still another set of clicking elements, each having a different diameter, a bevelled end and a squared or blunt end;

FIG. 2D is a side view of another set of clicking elements, each having a bevelled end and a rounded end;

FIG. 2E is a side view of a set of three clicking elements of varying diameter having facing bevelled ends and opposite bevelled ends;

FIG. 3 is a side sectional view of the transparent clicking capsule illustrated in FIG. 1, more particularly illustrating three clicking elements having various end configurations, provided in the clicking capsule;

FIG. 4 is a perspective view of the head and upper body portion of a flexible plastic grub lure, illustrating a preferred insertion of the transparent clicking capsule illustrated in FIGS. 1 and 3 into the grub body;

FIG. 5 is a partial sectional view of the flexible plastic grub illustrated in FIG. 4, more particularly illustrating the transparent clicking capsule fully inserted and embedded in functional configuration in the grub body;

FIG. 6 is a side view, partially in section, of a preferred plugged metal clicking capsule with two clicking elements having blunt end configurations provided therein;

FIG. 7 is an enlarged perspective view of the plug element of the metal clicking capsule illustrated in FIG. 6;

FIG. 8 is a perspective view of a typical capsule clip for securing the metal clicking capsule illustrated in FIG. 6 to a spinner bait or jig harness or hook;

FIG. 9 is a perspective view, partially in section, of a typical jig lure with the metal clicking capsule illustrated in FIG. 6 embedded therein;

FIG. 10 is a sectional view taken along line 10-10 of the jig lure illustrated in FIG. 9, more particularly illustrating embedment of the metal clicking capsule in the body thereof;

FIG. 11 is a perspective view, partially in section, of a jig lure with the metal jig capsule illustrated in FIG. 6 clipped to the jig hook;

DESCRIPTION OF THE PREFERRED EMBODIMENTS

Figure 12:
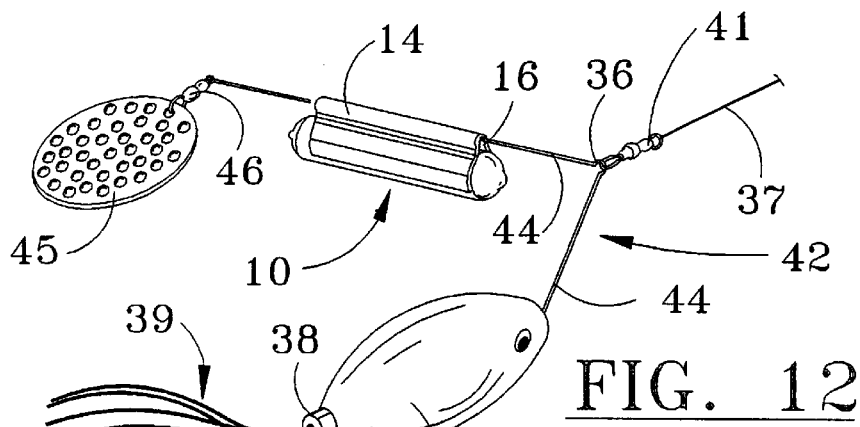
FIG. 12 is a side view of a spinner bait lure with the metal clicking capsule illustrated in FIG. 8 attached to the wire harness of the spinner bait lure by means of the capsule clip.

Referring initially to FIGS. 1–3 of the drawings, the transparent clicking capsule of this invention is generally illustrated by reference numeral 1. The transparent clicking capsule 1 is characterized by a small, elongated glass tube, vial or ampoule that has closed ends. In a most preferred embodiment, the tube or capsule shell 2 of the transparent clicking capsule 1 is drawn from hard glass tubing such as commercially available "Pyrex" (trademark) glass. Accordingly, the shell ends 3 normally protrude pursuant to the glass drawing effect, as illustrated in FIGS. 1 and 3. A shell cavity 4 is formed in the capsule shell 2 and one or more elongated, generally cylindrical clicking elements 5 are inserted in the shell cavity 4 before the shell ends 3 are heat-sealed. Accordingly, after the shell ends 3 are sealed as illustrated in FIGS. 1 and 3, the clicking elements 5 are free to slide end-to-end inside the shell cavity 4 between the shell ends 3 and strike the closed ends of the shell cavity 4 and each other, in the case of more than one clicking element 5, to emit the desired fish-attracting clicking noise.

As illustrated in FIGS. 2A–2E, the clicking elements 5 are characterized by a generally cylindrically-shaped metal body 6, having either rounded ends 7, bevelled ends 8, or blunt ends 9, or the like, which rounded ends 7, bevelled ends 8 and blunt ends 9 may be similar or dissimilar for any selected clicking element 5. For example, in FIGS. 2A and 2B the cylindrical bodies 6 of the two clicking elements 5 are both characterized by bevelled ends 8 which match each other as the clicking elements 5 slide back and forth inside the capsule shell 2 of a transparent clicking capsule 1. Similarly, as illustrated in FIG. 1, the clicking elements 5 are characterized by blunt ends 9, which likewise strike each other and the ends of the shell cavity 4 when the clicking elements 5 are caused to slide linearly inside the shell cavity 4. Furthermore, referring to FIG. 3, the clicking elements 5 may be of dissimilar length and may also be fitted with facing rounded ends 7, bevelled ends 8 and blunt ends 9, as illustrated. Moreover, as illustrated in FIGS. 2C and 2D, the clicking elements 5 may be of dissimilar length and diameter and may have facing rounded ends 7 or blunt ends 9 and opposite bevelled ends 8, as illustrated. As further illustrated in FIG. 2E, the clicking elements 5 may be characterized by facing bevelled ends 8 and opposite bevelled ends 8. Additionally, as illustrated in FIG. 6, the clicking elements 5 may be characterized by a rounded end 7 that faces a blunt end 9 inside the shell cavity 4 of a metal clicking capsule 10 and may have opposite blunt ends 9 and rounded ends 7, as illustrated. Accordingly, it will be appreciated by those skilled in the art that the clicking element or elements 5 which may be placed in the shell cavity 4 of the capsule shell 2 of both the transparent clicking capsule 1 and the metal clicking capsule 10 may be generally cylindrical in crosssectional configuration, thus having a cylindrical body 6, but may have a diameter of selected size and may be provided with either rounded end 7, bevelled end 8 or blunt ends 9, in any desired combination. In a most preferred embodiment of the invention the ends of the clicking elements 5 which face the shell ends 3 of the capsule shell 2 inside the shell cavity 4 of the transparent clicking capsule 1 are characterized by bevelled ends 8, since this configuration of the clicking elements 5 better fits the interior end configuration of lure shell cavity 4 and has proved to emit a louder clicking sound than the clicking elements 5 having rounded ends 7 or blunt ends 9. Accordingly, optimum clicking noises emitted from the transparent clicking capsule 1 are those due to one or more clicking elements 5 which are characterized by rounded ends 7, bevelled ends 8 or blunt ends 9 that face each other and opposite bevelled ends 8 that strike the internal ends of the shell cavity 4 of the capsule shell 2.

Referring now to FIGS. 4 and 5 of the drawings, in functional use, the transparent clicking capsule 1 is inserted in the flexible plastic grub body 18 of a flexible plastic grub 17 in the manner indicated in FIG. 4. The flexible plastic grub 17 typically has a grub tail 19 extending from the grub body 18 and is a popular lure for taking such fish as black bass. FIG. 5 illustrates complete embedment of the transparent clicking capsule 1 inside the grub body 18 in functional configuration, such that mounting of the grub body 18 on a hook assembly or jig head (not illustrated) allows retrieval of the flexible plastic grub 17 through a waterbody in conventional fashion, according to techniques well known to those skilled in the art. This retrieval causes the two clicking elements 5 located inside the shell cavity 4 of the capsule shell 2 of the transparent clicking capsule 1 to slide linearly, strike each other and the ends of the capsule shell 2 with each pull or twitch of the grub 17, and emit the desired clicking noise as the lure is retrieved.

Referring to FIGS. 6–11 and initially to FIGS. 6 and 7 of the drawings, in another preferred embodiment of the invention the metal clicking capsule 10 is characterized by a capsule tube 11, which is closed at one end and is sealed with a plug 12 at the opposite end to maintain two clicking elements 5 inside the tube cavity 13 of the capsule tube 11. The plug 12 may include an integral capsule clip 14, which has a clip opening 15 that communicates with a clip slot 16 in the capsule clip 14. Thus, the capsule clip 14 can be engaged with the hook 40 of a jig lure 34 to mount the metal clicking capsule 10 on the jig lure 34, as illustrated in FIG. 11. Accordingly, like the transparent clicking capsule 1 illustrated in FIGS. 1 and 8, the metal clicking capsule 10 can be mounted on the hook 40 or embedded in the jig lure body 35 of a jig lure 34 as illustrated in FIGS. 9–11 to facilitate a clicking action and noise from the clicking elements 5 as the jig lure 34 is retrieved. The jig lure 34 typically includes a line eye 36, receiving a line swivel 41 attached to the jig lure body 35, for attaching a fishing line 37, as well as a skirt flange 38 and the hook 40, which are hidden by a skirt 39. Insertion of the clicking elements 5 in the capsule tube 11 of the metal clicking capsule 10 is easily effected and closure of the capsule tube 11 by inserting the plug 12 is easily accomplished to seal the clicking elements 5 in the tube cavity 13 of the metal clicking capsule 10.

In yet another preferred embodiment of the invention, referring to FIGS. 8 and 12 of the drawings, the metal clicking capsule 10 is provided with a capsule clip 14 of different design from the capsule clip 14 provided on the plug 12. The capsule clip 14 has a clip slot 16 which receives the spinner harness 44 of a spinner bait lure 42, to facilitate interaction of the clicking elements 5 and emission of a clicking noise from the metal clicking capsule 10 when the spinner bait lure 42 is retrieved by means of line 37, tied to the line eye 36 by means of the line swivel 41. The spinner bait lure 42 is typically characterized by a solid, usually lead, spinner bait lure body 43 and a spinner 45 is rotatably attached to the spinner harness 44 by means of a spinner swivel 46.

Figure 13:
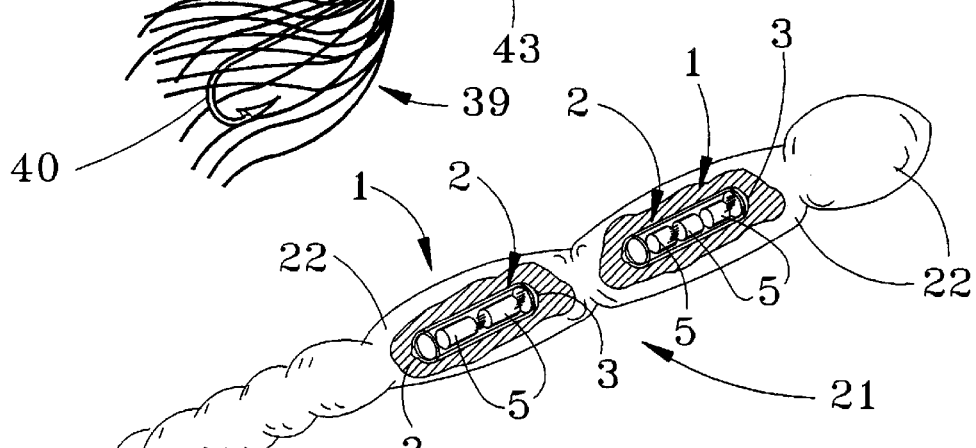
FIG. 13 is a perspective view of a flexible plastic worm with a pair of the transparent clicking capsules illustrated in FIGS. 1 and 3 embedded in tandem therein.

Referring now to FIG. 13 of the drawings, a flexible plastic worm 21 is illustrated, with an elongated worm body 22, terminating in a worm tail 23. A pair of transparent clicking capsules 1 are inserted in tandem relationship in the worm body 22 in the same manner as that illustrated with respect to the flexible plastic grub 17, illustrated in FIG. 5 of the drawings. Accordingly, the transparent clicking capsules 1 in the flexible plastic worm 21 emit approximately twice the clicking intensity of a single transparent clicking capsule 1 as the flexible plastic worm 21 is mounted on a hook assembly or jig head (not illustrated) and retrieved through a waterbody.

Figure 14:
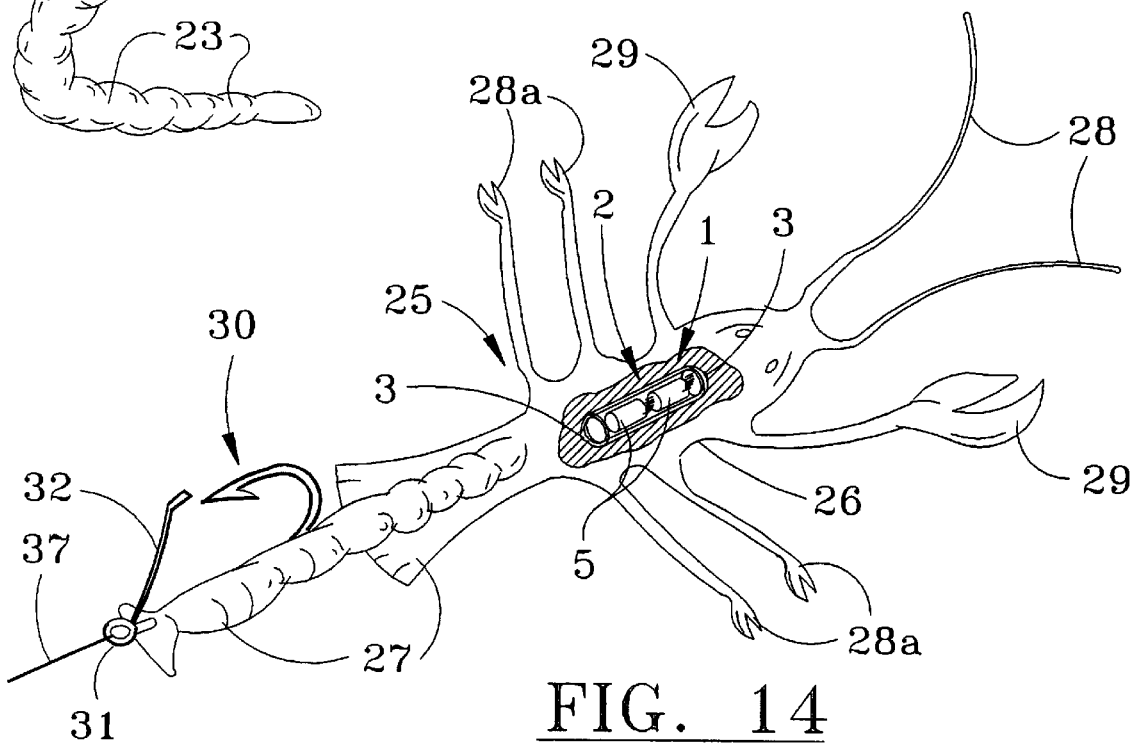
FIG. 14 is a top view, partially in section, of a flexible plastic crawfish having a transparent clicking capsule containing two clicking elements embedded therein.

Similarly, referring to FIG. 14 of the drawings, a flexible plastic crawfish 25 is illustrated, having a crawfish body 26, terminated by a crawfish tail 27 and also having simulated feelers 28 and claws 29. A hook 30 is embedded in the crawfish 27 and includes a hook eye 31, to which is attached a line 37 and fitted with a weed guard 32. A transparent clicking capsule 1 is embedded in the crawfish body 26 of the flexible plastic crawfish 25 in the same manner as that illustrated in FIG. 5 with respect to the flexible plastic grub 17. Retrieval of the flexible plastic crawfish 25 through a waterbody by means of the hook 30 or a suitable hook assembly or jig head (not illustrated) therefore causes the clicking elements 5 located in the capsule shell 2 of the transparent clicking capsule 1 to emit a clicking noise as the clicking elements slide linearly and strike each other, as well as the ends of the capsule shell 2.

It will be appreciated by those skilled in the art that the shape, size (length and diameter) and character of the clicking elements 5 placed in either the transparent clicking capsule 1 or the metal clicking capsule 10 may vary, depending upon the desired quality and intensity of sound which is to be emitted from the respective capsule shell 2 and capsule tube 11. Accordingly, a single clicking element 5 of relatively large diameter may be provided in the capsule shell 2 and capsule tube 11, respectively, under circumstances where a more pronounced, lower pitched clicking noise is emitted from the transparent clicking capsule 1 and the metal clicking capsule 10, respectively. A higher pitched clicking noise can be accomplished by using multiple smaller clicking elements 5 in the respective capsule shell 2 and capsule tube 11, as illustrated in FIGS. 2A–2E, respectively. Furthermore, the ends of each respective clicking element 5 may be shaped to define a rounded end 7, a bevelled end 8 and/or a blunt 9 to further define the nature and character of the sound emitted from the transparent clicking capsule 1 and the metal clicking capsule 10.

It will be further appreciated by those skilled in the art that, as described above, the diameter of the respective clicking elements 5 may be the same or different in any desired capsule. However, the clicking element diameter is most preferably chosen such that this diameter is less than the internal diameter of the capsule shell 2 which defines the shell cavity 4 in both the transparent clicking capsule 1 and the metal clicking capsule 10. There must be sufficient room in the shell cavity 4 of the capsule shell 2 and in the tube cavity 13 of the capsule tube 11, respectively, to facilitate linear sliding of the respective clicking elements 5 in the shell cavity 4 and tube cavity 13 in end-to-end relationship.

However, the diameter or diameters of the respective clicking elements 5 should be sufficiently large to prevent stacking or overlapping of the clicking elements 5 in the respective shell cavity 4 and tube cavity 13, to insure that the clicking elements 5 always move linearly in tandem or linearly-aligned relationship to facilitate optimum noise emission from the transparent clicking capsule 1 and the metal clicking capsule 10, respectively.

The quality and nature of sound emitted from the respective transparent clicking capsule 1 and metal clicking capsule 10 are further defined and adjusted by the nature of the clicking elements 5. For example, the more dense clicking elements 5 which are constructed of steel, yield a clicking noise of different character from clicking elements 5 which are constructed of the lighter metals, aluminum and copper, for example. This factor can also be used to construct a transparent clicking capsule 1 and metal clicking capsule 10 having a clicking noise of selected intensity and character when coupled with the shaping of the individual clicking elements 5, to define either rounded ends 7, bevelled ends 8 and/or the blunt ends 9 or otherwise shaped clicking elements 5. Furthermore, the clicking noise variation can be also adjusted by choosing the size and number of clicking elements 5 located in the shell cavity 4 and tube cavity 13 of the respective capsule shell 2 and capsule tube 11, respectively.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A clicking capsule for fishing lures comprising capsule means for insertion in the fishing lures, a first elongated, cylindrical, solid clicking element and a second elongated, cylindrical, solid clicking element slidably disposed in said capsule in end-to-end relationship, said first clicking element having a first bevelled end for engaging said capsule means and a second bevelled end spaced from said first bevelled end; and said second clicking element having a third bevelled end for engaging said second bevelled end of said first clicking element and a fourth bevelled end spaced from said third bevelled end for engaging said capsule means, whereby said first clicking element and said second clicking element slide in said capsule means and strike said capsule means and each other to emit a clicking sound when the fishing lures are retrieved.

2. The clicking element of claim 1 wherein said capsule means includes a generally cylindrical internal cavity having a selected cavity diameter and the diameter of said first clicking element and said second clicking element is greater than one-half of said cavity diameter of said capsule means.

3. The clicking capsule of claim 1 wherein said capsule includes a generally cylindrical internal cavity having a selected cavity diameter and the diameter of said first clicking element and said second clicking element is greater than one-half of said cavity diameter of said capsule.

4. The clicking capsule of claim 1 wherein said capsule means is metal and has an open end and a closed end and comprising a plug provided in said open end to seal said clicking element means inside said capsule.

5. A clicking capsule for insertion in fishing lures and emitting a clicking noise when the fishing lures are retrieved, said clicking capsule comprising a glass capsule having an internal cavity; a first elongated, solid, generally cylindrical clicking element slidably disposed in said internal cavity of said glass capsule, said first clicking element having a first bevelled end for engaging said capsule and a second bevelled end spaced from said first bevelled end; a second elongated, solid, generally cylindrical clicking element slidably disposed in said internal cavity of said glass capsule, said second clicking element having a third bevelled end for engaging said second bevelled end of said first clicking element and a fourth bevelled end spaced from said third bevelled end; and a third solid, generally cylindrical clicking element slidably disposed in said internal cavity of said glass capsule, said third clicking element having a fifth bevelled end for engaging said fourth bevelled end of said second clicking element and a sixth bevelled end spaced from said fifth bevelled end for engaging said capsule, whereby said clicking noise is generated responsive to contact between said first and said second clicking elements and between said second and said third clicking elements, and between said first clicking element and said glass capsule and said third clicking element and said glass capsule when the fishing lures are retrieved.

6. A clicking capsule for insertion in fishing lures and emitting a clicking noise when the fishing lures are retrieved, said clicking capsule comprising a metal capsule having an internal cavity; a first elongated, solid, generally cylindrical clicking element disposed in said internal cavity of said metal capsule, said first clicking element having a first bevelled end for engaging said capsule and a second bevelled end spaced from said first bevelled end; a second elongated, solid, generally cylindrical clicking element slidably disposed in said internal cavity of said glass capsule, said second clicking element having a third bevelled end for engaging said second bevelled end of said first clicking element and a fourth bevelled end spaced from said third bevelled end; and a third solid, generally cylindrical clicking element slidably disposed in said internal cavity of said glass capsule, said third clicking element having a fifth bevelled end for engaging said fourth bevelled end of said second clicking element and a sixth bevelled end spaced from said fifth bevelled end for engaging said capsule; a plug closing one end of said metal capsule and clip means carried by said plug, whereby said clicking noise is generated responsive to contact between said first and said second clicking elements and said second and said third clicking elements and between said first clicking element and said metal capsule and said third clicking element and said metal capsule when said clip means is attached to the fishing lures and the fishing lures are retrieved.

* * * * *